United States Patent
Brunet et al.

(10) Patent No.: US 8,189,983 B2
(45) Date of Patent: May 29, 2012

(54) FIBER CIRCUIT MANAGEMENT SYSTEM WITH SPLICE TRAY

(75) Inventors: Herve Brunet, St. Nazaire (FR); Patrick Drouard, Pontchateau (FR); Rutesh D. Parikh, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 488 days.

(21) Appl. No.: 12/439,761

(22) PCT Filed: Sep. 13, 2007

(86) PCT No.: PCT/US2007/078391
§ 371 (c)(1),
(2), (4) Date: Mar. 3, 2009

(87) PCT Pub. No.: WO2008/033997
PCT Pub. Date: Mar. 20, 2008

(65) Prior Publication Data
US 2010/0183274 A1    Jul. 22, 2010

Related U.S. Application Data

(60) Provisional application No. 60/825,513, filed on Sep. 13, 2006, provisional application No. 60/955,202, filed on Aug. 10, 2007.

(51) Int. Cl.
*G02B 6/00* (2006.01)

(52) U.S. Cl. .................................................. 385/135
(58) Field of Classification Search .................. 385/135
See application file for complete search history.

(56) References Cited

U.S. PATENT DOCUMENTS

| | | |
|---|---|---|
| 5,421,532 A | 6/1995 | Richter |
| 5,740,298 A | 4/1998 | Macken et al. |
| 6,061,492 A | 5/2000 | Strause et al. |
| 6,249,632 B1 | 6/2001 | Wittmeier, II et al. |
| 6,249,633 B1 | 6/2001 | Wittmeier, II et al. |
| 6,269,214 B1 | 7/2001 | Naudin et al. |
| 6,304,707 B1 | 10/2001 | Daems et al. |
| 6,449,418 B1 | 9/2002 | Brocheton |
| 6,504,987 B1 | 1/2003 | Macken et al. |
| 6,865,330 B2 | 3/2005 | Lecomte et al. |
| 2004/0175090 A1 | 9/2004 | Vastmans et al. |

FOREIGN PATENT DOCUMENTS

| | | |
|---|---|---|
| EP | 0 712 018 A1 | 5/1996 |
| JP | 11-167029 | 6/1999 |
| WO | WO 96/10203 | 4/1996 |

*Primary Examiner* — Omar Rojas
(74) *Attorney, Agent, or Firm* — Gregg H. Rosenblatt

(57) ABSTRACT

A fiber management system (100) comprises a fiber circuit platform (110) and a splice tray (150) to hold a fiber splice, the splice tray (150) being rotatably coupled to the fiber circuit platform (110). The splice tray includes at least one latching mechanism (152) rotatably engageable with the fiber circuit platform (110) and disposed on an outer portion of the splice tray. The fiber management system (100), in particular, the fiber circuit platform (110) allows a user to provide straightforward fiber circuit management at a premise or location.

18 Claims, 15 Drawing Sheets

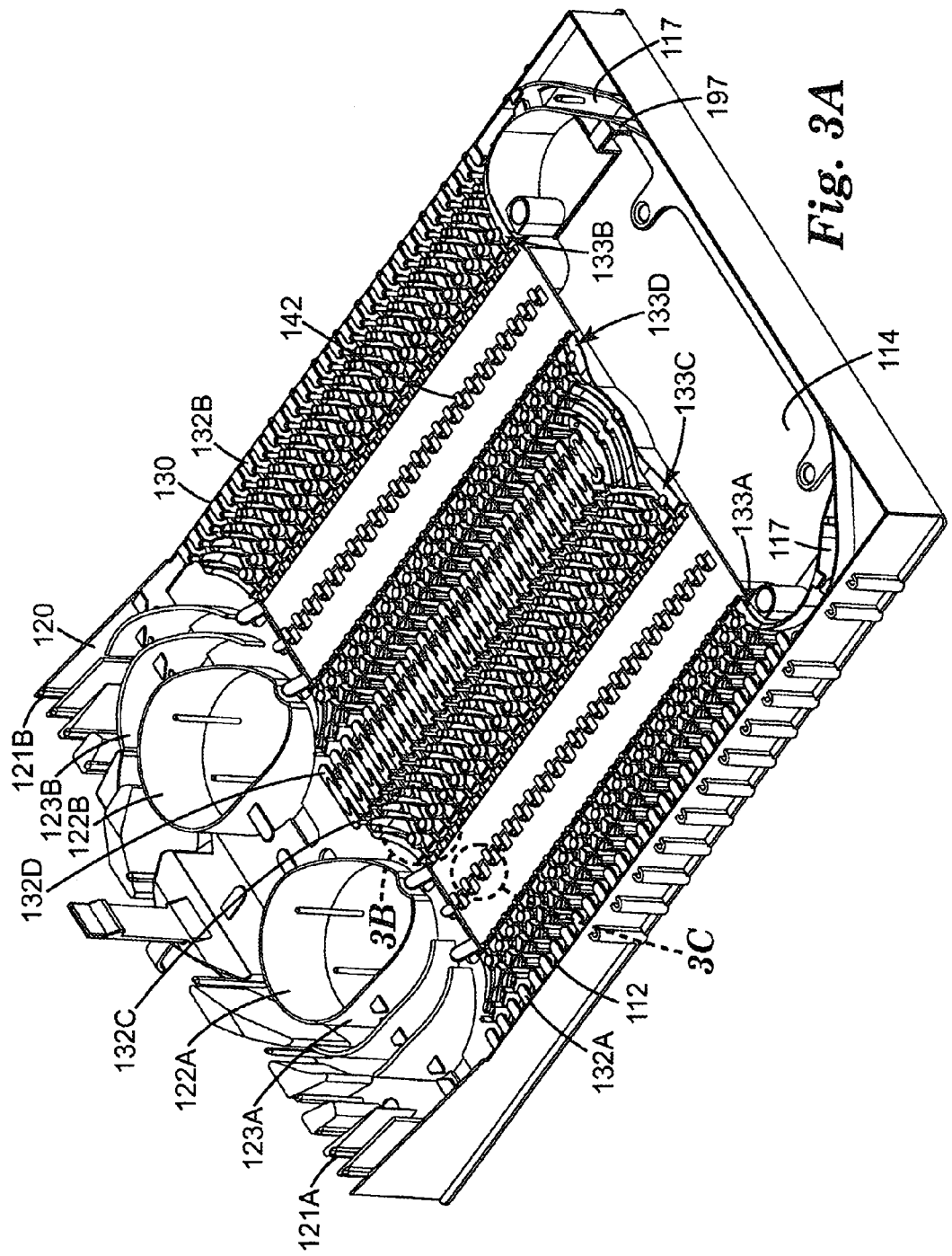

FIBER CIRCUIT MANAGEMENT SYSTEM WITH SPLICE TRAY

CROSS REFERENCE TO RELATED APPLICATION

This application is a national stage filing under 35 U.S.C. 371 of PCT/US2007/078391, filed Sep. 13, 2007, which claims the benefit of U.S. Provisional Patent Application No. 60/825,513, filed Sep. 13, 2006, and U.S. Provisional Patent Application No. 60/955,202, filed Aug. 10, 2007, the disclosures of which are incorporated by reference herein in their entirety.

THE FIELD OF THE INVENTION

The present invention relates generally to a fiber management system for telecommunications.

BACKGROUND OF THE INVENTION

Telecommunication cables are used for distributing all manner of data across vast networks. A telecommunication cable typically includes a bundle of individual telecommunication lines (either optical fibers or copper wires) that are encased within a protective sheath. As telecommunication cables are routed across data networks, it is necessary to periodically open the cable so that one or more telecommunication lines therein may be spliced, thereby allowing data to be distributed to other cables or "branches" of the telecommunication network. The cable branches may be further distributed until the network reaches individual homes, businesses, offices, premises, and so on.

At each point where a telecommunication cable is opened, some type of enclosure is provided to protect the exposed interior of the cable. Commonly, the enclosure has one or more ports through which cables enter and/or exit the enclosure. Once inside the enclosure, the cable is opened to expose the telecommunication lines therein. Conventional telecommunication enclosures are constructed to facilitate the management and protection of individual telecommunication lines and splices thereof.

SUMMARY OF THE INVENTION

In one aspect, an embodiment of the invention described herein provides a fiber circuit management system. The fiber circuit management system comprises a fiber circuit platform and a splice tray to hold a fiber splice, the splice tray being rotatably coupled to the fiber circuit platform. The splice tray includes at least one latching mechanism rotatably engageable with the fiber circuit platform and disposed on an outer portion of the splice tray. In another aspect, the latching mechanism includes a coupling portion and one or more fiber entrance/exit channels. In a further aspect, the one or more fiber entrance/exit channels are formed as an extension that extends away from a main splice tray body area. In a further aspect, the one or more fiber entrance/exit channels extend in a slightly curved configuration. In a further aspect, the one or more fiber entrance/exit channels are substantially "U" shaped in cross-section.

In another aspect, each of the one or more fiber entrance/exit channels extends to a position proximate to a respective fiber guiding channel formed on the fiber circuit platform.

In another aspect, the splice tray includes a plurality of latching mechanisms each formed on a different outer part of the splice tray.

In another aspect, the splice tray includes a splicing area configured to support at least one of a mechanical splice and a fusion splice. In a further aspect, the mechanical or fusion splice can be of a single fiber or of a mass or ribbon fiber. In a further aspect, the splicing area is formed as an integral portion of the splice tray. In an alternative aspect, the splicing area is formed as a cutout configured to receive at least one insert having a portion configured to support the at least one of a mechanical splice and a fusion splice.

In another aspect, the splice tray holding portion can be configured to hold or secure one or more of 1×N fiber optic splitters, 2×N fiber optic splitters, WDM components, CWDM components, and combinations thereof. In a further aspect, the splice tray holding portion can also hold one or more switches, multiplexers, triplexers, duplexers, detectors, mirrors, lasers, amplifiers, and combinations thereof.

In another aspect, the splice tray includes a fiber routing structure that provides for a changing of the direction of the fiber in more than one direction.

In another aspect, the fiber circuit platform includes a main fiber entrance/exit region and a fiber circuit guiding region. In a further aspect, the fiber circuit platform has a two level structure, with a first level configured for fiber routing and a second level configured for fiber slack storage.

In another aspect, the fiber circuit platform further includes a slack storage tray mountable to a portion thereof.

In another aspect, the fiber entrance/exit region includes a plurality of fiber guides that provide for the separation and alignment of fibers received therein. In a further aspect, the fiber entrance/exit region further includes one or more fiber routing structures that provide for routing and rerouting of fibers received therein. In a further aspect, the fiber entrance/exit region further includes a removable protective cover.

In another aspect, the first level of the fiber circuit platform includes a fiber circuit guiding structure configured to route fibers in multiple directions and to multiple splice tray locations. In a further aspect, the fiber circuit guiding structure includes multiple fiber channels to continually support fiber as it is routed about the fiber management system. In a further aspect, the fiber circuit guiding structure includes one or more fiber corridors which provide for lengthwise passage of a fiber along the fiber circuit platform, wherein each corridor can route fiber to either end of the fiber circuit platform and provide fiber access to individual splice trays mounted on the fiber circuit platform. In a further aspect, each fiber corridors is disposed adjacent to a multi-directional fiber channel region, wherein the multi-directional fiber channel region provides a plurality of fiber supporting channels configured to direct fiber in more than one direction to and from an entrance/exit channel of the splice tray and at a bending radius that does not exceed a minimum bend radius of fiber supported therein.

In another aspect, the fiber circuit guiding region comprises a plurality of hooks, each hook configured to engage any of the plurality of latching mechanisms of the splice tray.

In another aspect, the fiber circuit platform is housed in a telecommunications enclosure. In a further aspect, the enclosure includes a base portion having one or more ports configured to receive or distribute telecommunications cables.

In yet another aspect, an embodiment of the invention described herein provides a fiber circuit management system comprising a fiber circuit platform that includes a main fiber entrance/exit region and a fiber circuit guiding region, and a splice tray rotatably mountable to the fiber circuit guiding region, wherein the fiber circuit platform has a multiple level structure, with a first level configured for fiber routing and a second level configured for slack storage, wherein received fibers are guided to the fiber routing level via at least one ramp.

In another aspect, the splice tray includes a latching mechanism to rotatably couple the splice tray to fiber circuit guiding region, wherein each latching mechanism includes a coupling portion and one or more fiber entrance/exit channels, wherein the coupling portion comprises a post and moveable member securable in a hoop structure formed on the fiber circuit platform, wherein the moveable member is depressible such that the post can be engaged into position in the hoop structure.

In another aspect, the fiber circuit management system further comprises a post and washer structure coupled to and extending from conduits formed on the second level, wherein a series of posts separate bundled fibers and washers which are snugly fit around one or more of the posts hold the fibers in place by washers.

In another aspect, the one or more fiber entrance/exit channels are formed as an extension that extends away from a main splice tray body area in a slightly curved configuration. In a further aspect, the one or more fiber entrance/exit channels are substantially "U" shaped and extend to a position proximate to a respective fiber guiding channel formed on the fiber circuit platform.

In another aspect, the first level is rotatable relative to the second level. In a further aspect, the first level is connected to the second level via a rotatable coupling having portions formed on both the first and second levels, wherein the coupling includes a slit portion formed therein.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

Embodiments of the invention are better understood with reference to the following drawings. The elements of the drawings are not necessarily to scale relative to each other.

FIG. 3A is an isometric view of an exemplary fiber circuit platform according to an aspect of the present invention.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense.

The present invention is directed to fiber management systems, in particular, a fiber circuit platform, as embodied in several different fiber circuit platforms described below, which allow a user to provide straightforward fiber circuit management at a premise or location. Fiber management, also referred to as "single circuit management," is the management of optical fibers by separating individual optical fiber circuits from each other. A single circuit may constitute one or more fibers that carry optical signals between two different locations. Thus, a single circuit may be a single fiber which connects a transmitter/receiver pair at a first location and a transmitter/receiver pair at a second location. Alternatively, a single circuit may utilize plurality of optical fibers interconnecting a transmitter at a first location and a receiver at a second location, and a plurality of fibers connecting a transmitter at the second location and a receiver at the first location.

Single circuit management can allow individual circuits to be managed without disturbing other adjacent circuits. Optical signals carried by any given single circuit should not be degraded by installation/maintenance operations carried out on other single circuits of the system. This can be accomplished by ensuring that each single circuit is housed and routed as a separate entity at a point in the network where re-entry for installation/maintenance purposes is possible. The example platforms described herein can provide such features.

Figure 1:
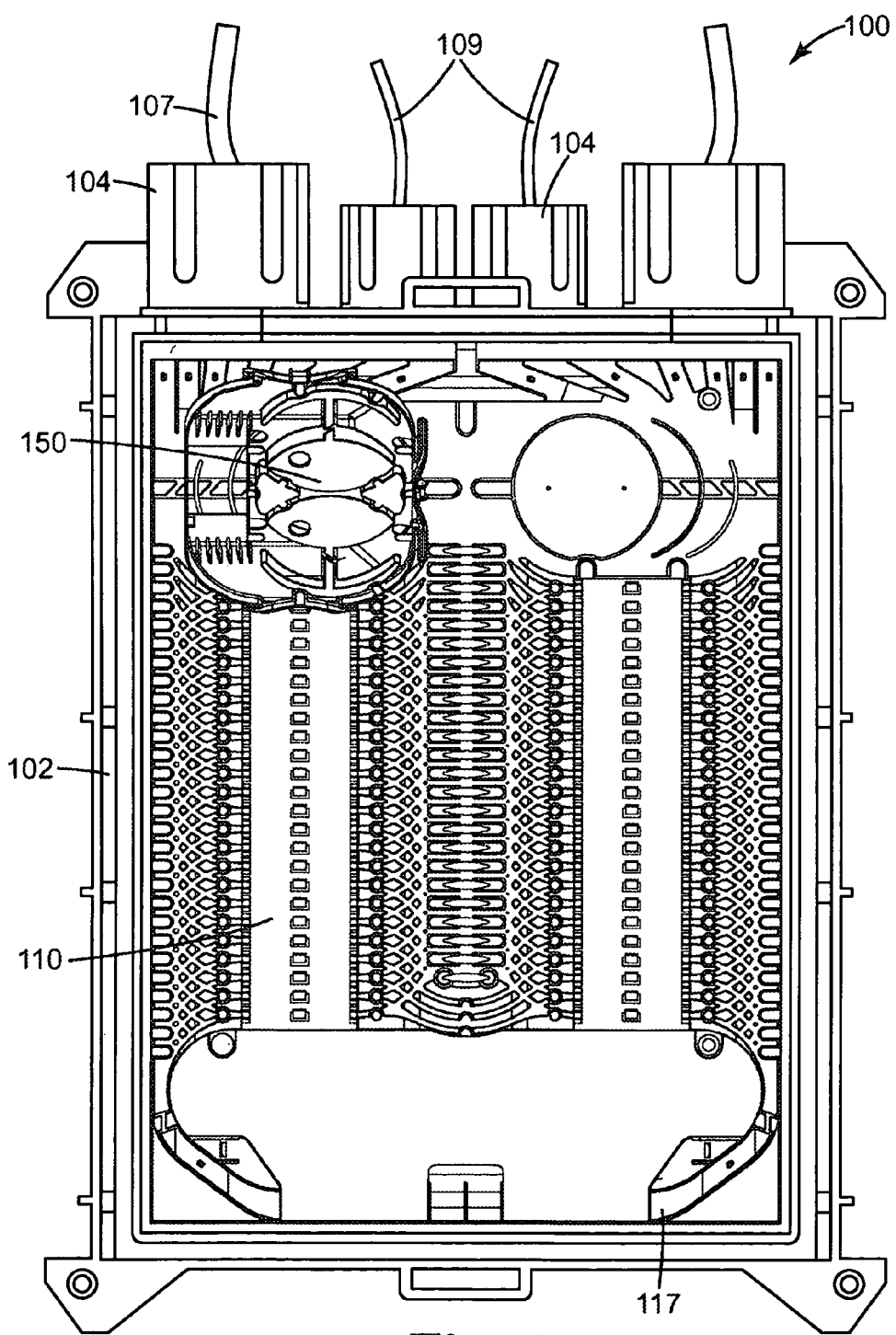
FIG. 1 is an isometric view of an exemplary fiber circuit management system according to an aspect of the present invention.

FIG. 1 shows a fiber circuit management system 100 according to an exemplary embodiment of the present invention. Exemplary enclosure 102 (shown in an open state) is configured to house a fiber circuit platform 110 (described in more detail with respect to FIGS. 3A-3C), which can include a plurality of exemplary splice trays 150 (described in more detail with respect to FIG. 2), as explained in further detail below. The enclosure 102 can be formed from a base (seen generally in FIGS. 1, 7, and 8) and a cover (not shown). Preferably, the housing cover is configured to be mated with the base portion shown in FIG. 1 to provide a rugged seal about and/or protect the fiber circuit platform 110 from damaging outside conditions (e.g., weather, insects and other external hazards).

Enclosure 102 can take any standard shape, such as a standard aerial closure, closure and terminal, pedestal, and others. For example, the enclosure 102 can have a shape (both outer and general internal region) similar to the enclosure described U.S. Pat. No. 6,269,214 (incorporated by reference in its entirety, see e.g., FIG. 1 therein). Alternatively, the fiber circuit platform 110 by itself, or as part of its closure, can be implemented in a cabinet environment.

The various components of the enclosure 102, including the base, cover, and fiber circuit platform 110, and elements thereof, can be formed of any suitable material. The materials are selected depending upon the intended application and may include both polymers and metals. In one embodiment, the base and cover, and the other components, such as the fiber circuit platform 110, are formed of polymeric materials by methods such as injection molding, extrusion, casting, machining, and the like. Alternatively, components may be formed of metal by methods such as molding, casting, stamping, machining and the like. Material selection will depend upon factors including, but not limited to, chemical exposure conditions, environmental exposure conditions including temperature and humidity conditions, flame-retardancy requirements, material strength, and rigidity, to name a few.

The base of enclosure 102 can include one or more ports for receiving and distributing telecommunications cables. For example, as shown in FIG. 1 (and more generally in FIGS. 7 and 8), one or more ports 104 can be configured to receive distribution cables 107. In addition, one or more ports can be configured to allow passage of one or more drop cables 109 which supply fiber to a particular customer or premise. The ports 104 can allow passage of a single cable, or multiple cables in combination with a sealing member as is known in the art. The base may have one, two, or any other number of ports as is required for a particular enclosure 102. In addition, the ports can be configured to receive standard cable inlet devices, such as those described in U.S. Pat. No. 6,269,214.

Figure 2:
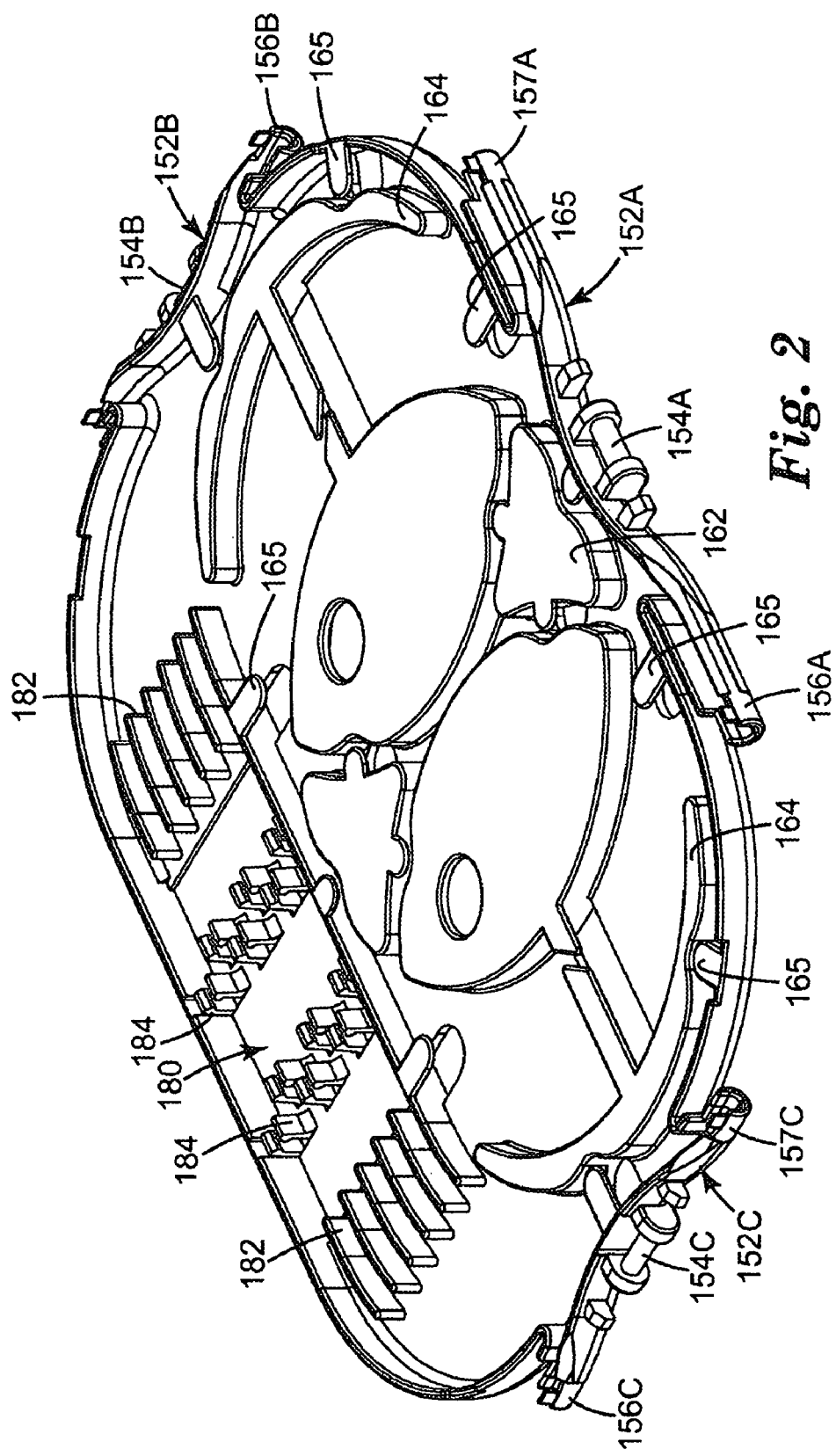
FIG. 2 is an isometric view of an exemplary splice tray according to an aspect of the present invention.

In one aspect, one or more exemplary splice trays 150 are coupled to fiber circuit platform 110. Splice trays 150 are provided so that, e.g., a distribution cable fiber can be connected to a drop cable fiber, or other cable fiber, to distribute the signal in an intended manner. As shown in FIG. 2, splice tray 150 can be formed as a generally rectangular or oblong structure. Although the term "splice tray" is used throughout, as is described in more detail below, in alternative aspects, tray 150 can hold passive and/or active optical components, as well as splices.

In a preferred aspect, splice tray 150 includes at least one latching mechanism that allows for rotation of the splice tray while secured to the fiber circuit platform. In alternative aspects, the splice tray 150 includes multiple latching mechanisms that each allow for rotation of the splice tray while secured to the fiber circuit platform. For example, in FIGS. 5A and 5B, a splice tray 250 is shown with a single latch mechanism, whereas FIG. 2 shows a splice tray with multiple latching mechanisms.

Figure 4A:
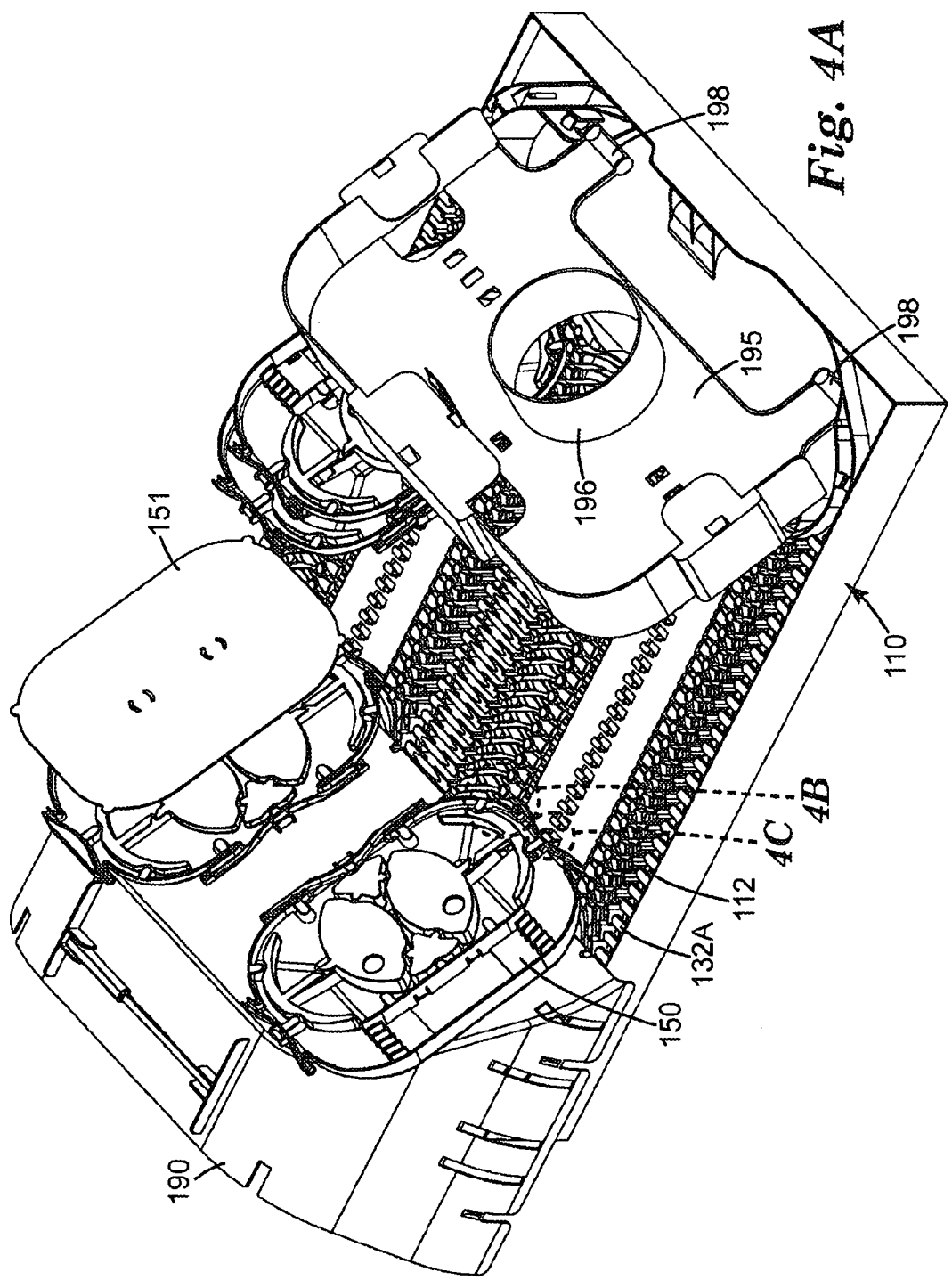
FIG. 4A is an isometric view of an exemplary fiber circuit platform with a splice tray coupled thereon according to an aspect of the present invention.
Figure 4B:
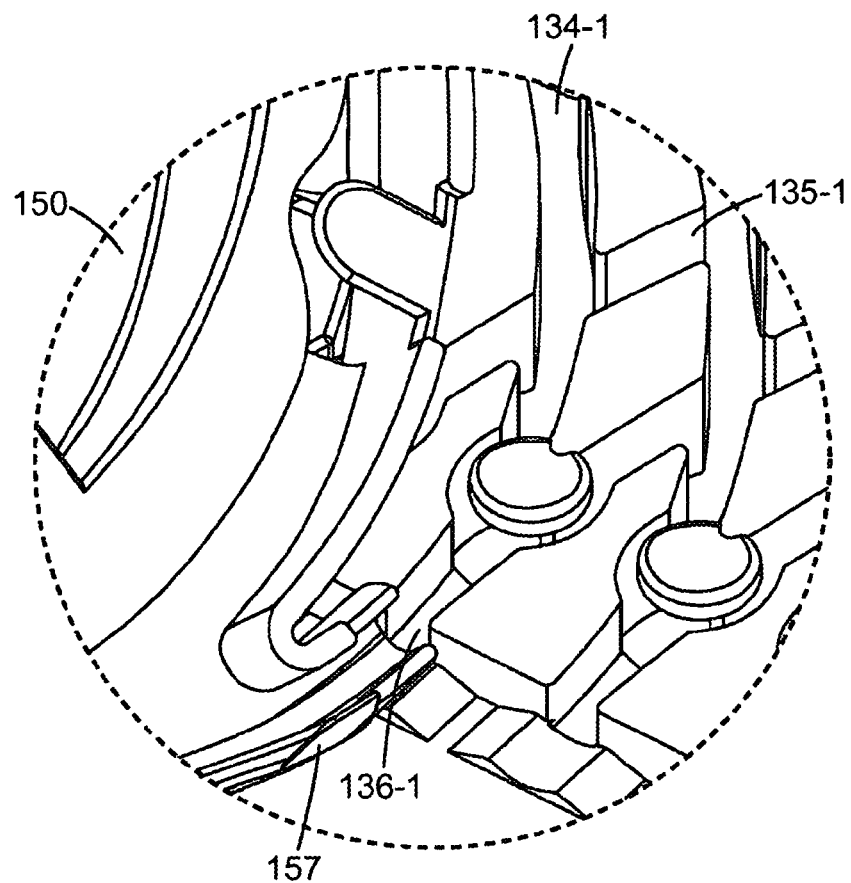
FIG. 4B is a close-up view of an exemplary fiber entrance/ exit channel extending to a position proximate to a fiber guiding channel according to an aspect of the present invention.
Figure 4C:
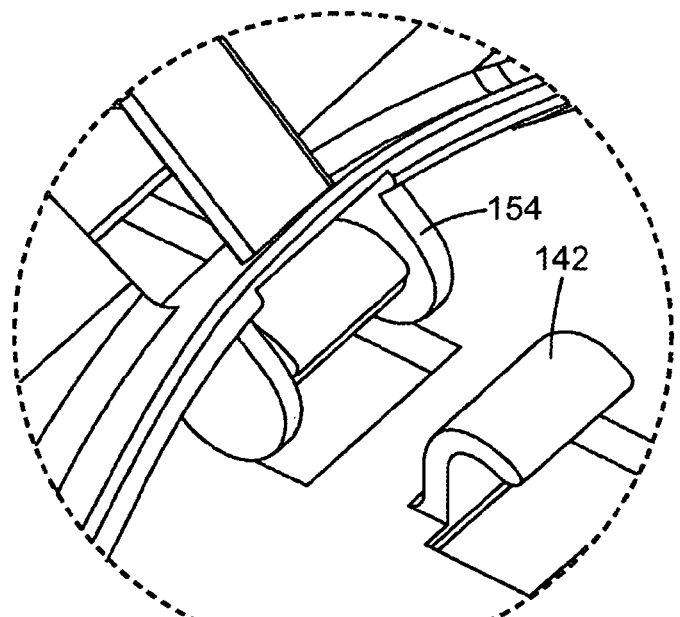
FIG. 4C is a close-up view of an engaged latching mechanism according to an aspect of the present invention.

In more detail, FIG. 2, splice tray 150 includes latching mechanisms 152A, 152B, and 152C. Each latching mechanism is formed on a different outer portion of the body of splice tray 150. By having multiple latching mechanisms (e.g., at 2 or 3 different latching locations, preferably at 3 latching locations), splice tray 150 can be coupled to a fiber circuit platform 110 in more than one orientation (see e.g., the enclosure of FIG. 7, which includes splice trays positioned in two different orientations). With this configuration, a splice tray 150 can be utilized with several different closure systems having different physical parameters, such as depth and width. In the embodiment of FIGS. 4A-4C, for example, latch 154C is coupled to fiber circuit platform 110. In another embodiment (not shown), latch 154B can be coupled to the fiber circuit platform.

Each latching mechanism can include a coupling portion 154 and one or more fiber entrance/exit channels 156, 157. Coupling portion 154, formed as a rod in FIG. 2, can be coupled (e.g., by snap-fit) to hook portion 142 of fiber circuit platform 110 to rotatably connect the splice tray 150 to the fiber circuit platform 110 (see FIG. 4C for a close-up view). Alternatively, as described in more detail below with respect to FIG. 5B, the coupling mechanism can have a different configuration.

In a preferred aspect, fiber entrance/exit channels 156A-156C, 157A-157C are formed as extensions that extend away from the main splice tray body area. In addition, fiber entrance/exit channels 156A-156C, 157A-157C can extend from the latching area in a slightly curved configuration to prevent potential kinks or unintended bends being placed on the entering/exiting fibers that are received by the splice tray.

In addition, fiber entrance/exit channels 156, 157 provide continual support to the entering/exiting fibers as the splice tray 150 is being rotated forward and backward while secured on fiber circuit platform 110. In a preferred aspect, channels 156, 157 are formed having a (relatively) deep "U" shape in cross-section, which supports fiber disposed therein even when the splice tray is fully tilted in either direction. As shown in more detail in FIG. 4B, when latched, the fiber entrance/exit channels 156, 157 can extend to a position proximate to a fiber guiding channel 136 formed on the fiber circuit platform 110. Thus, fiber being routed to or from the splice tray can be continually supported.

Fiber from the distribution cable/drop cable is received in fiber entrance/exit channels 156, 157 and then routed to a splicing area 180. The splicing area 180 is configured to support mechanical and/or fusion splices made to the fiber. The mechanical or fusion splices can be of a single fiber or of a mass or ribbon fiber. For example, one or more fiber guiding channels 182 can guide the fiber(s) to splicing portion 184 that is configured to securely hold one or more mechanical splices (e.g., via snug or snap fit). In one aspect, splicing portion 184 can comprise a number of resilient clips or other holders designed to hold one or more 4x4 FIBRLOK™ splices (commercially available from 3M Company, St. Paul Minn.). The splicing portion 184 can be formed as an integral portion of tray 150. Alternatively, tray 150 can be formed with a cutout at splicing area 180 so that different splicing inserts can be mounted to the tray 150, depending on the application (e.g., an insert configured to support one or more fusion splices, or an insert to support one or more mechanical splices).

Figure 13:
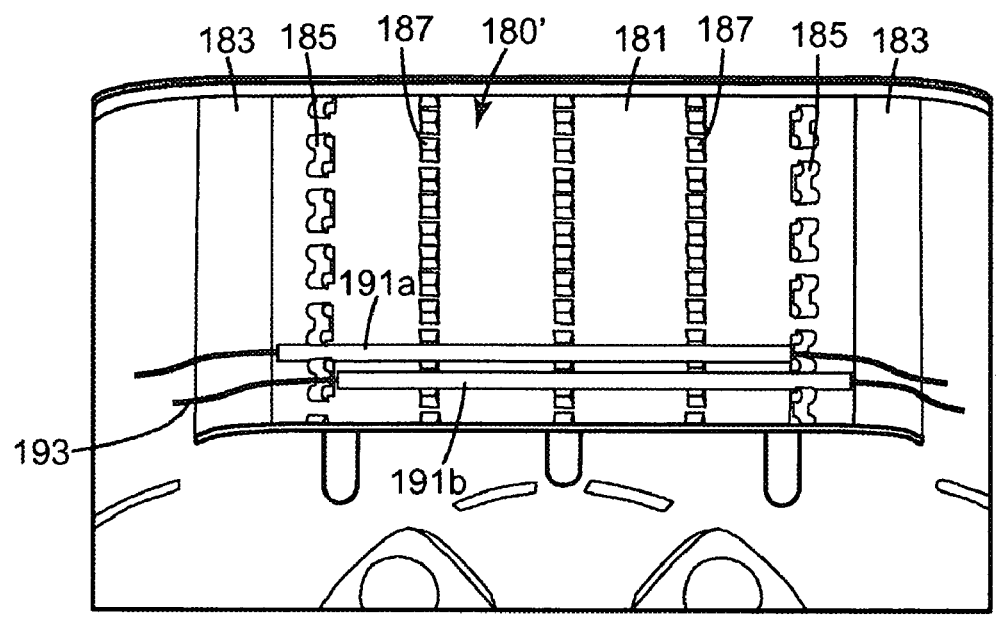
FIG. 13 is a top view of an alternative splicing area according to an aspect of the present invention.

In an alternative embodiment, as is shown in FIG. 13, fiber from the distribution cable/drop cable can be routed to a splicing area 180'. The splicing area 180' is configured to support a plurality of mechanical and/or fusion splices made to the fiber and to reduce the likelihood of unwanted lateral and longitudinal motion by the splices. For example, a base portion 181 can include a plurality of posts 185 having lobe-shaped portions configured to snuggly engage or grip (e.g., via a snap fit between two adjacent lobes) mechanical splice housings, protective splice tubes or sleeves and/or fusion splice splitter tubes, such as splice sleeves 191a and 191b.

In a further aspect, the posts 185 can include grooves to allow passage of the spliced fibers, such as fiber 193, in some configurations. Additionally, splicing area 180' can include a plurality of guiding structures 187 disposed between the posts 185 to further align and prevent lateral displacement of the splice sleeves. In one alternative aspect, the base portion 181 can also include heightened base portions 183 disposed at or near the posts 185 having a slightly increased thickness to reinforce and further stabilize the splice area and the splice and help prevent movement. As shown in FIG. 13, the splices can be arranged in a staggered manner. In a preferred aspect, base 181 is configured to secure a plurality of splices having either a 60 mm length or a 45 mm length.

Figure 14:
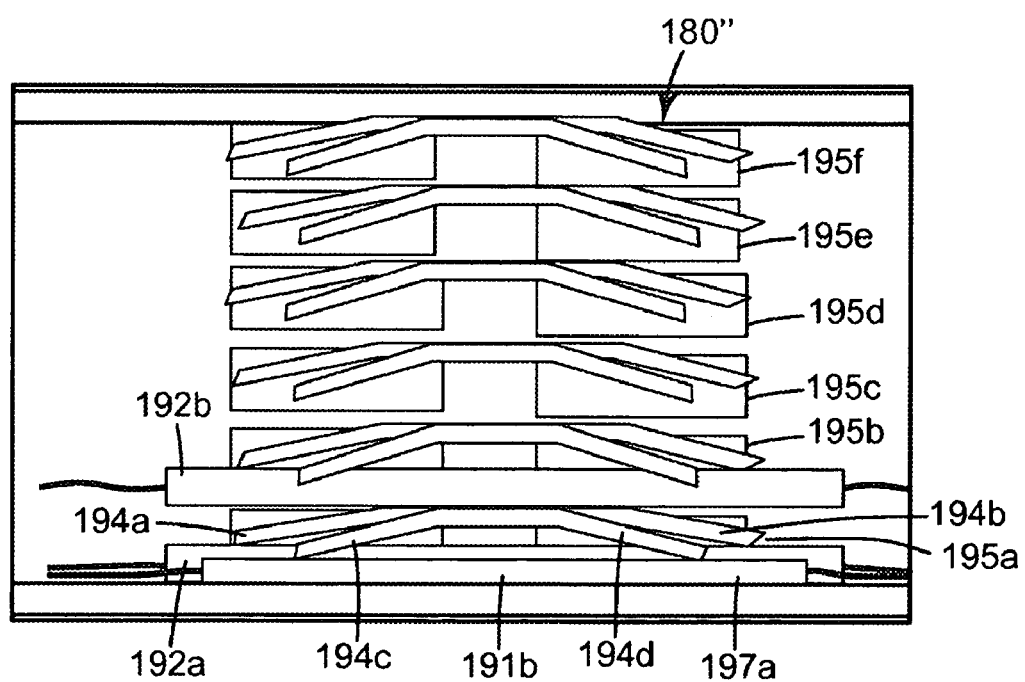
FIG. 14 is a top view of another alternative splicing area according to an aspect of the present invention.

In another alternative embodiment, as is shown in FIG. 14, fiber from the distribution cable/drop cable can be routed to a splicing area 180". The splicing area 180" is configured to support a plurality of mechanical and/or fusion splices made to the fiber in a compact area. In an exemplary aspect, splicing area 180" can secure splices in a stacked arrangement.

For example, splicing area 180" includes a plurality of splice holding channels (six channels 195a-195f are shown in the example), including first splice holding channel 195a and second splice holding channel 195b. Each splice holding channel can be configured to hold one or more splices. For example, as shown in FIG. 14, splice holding channel 195a can secure a mechanical splice 192a and a fusion splice 191b that is stacked on top of splice 192a. Similarly, splice holding channel 195b can secure a mechanical splice 192b.

Each splice holding channel can include one or more flexible arms, such as spring arms 194. These arms can be formed to extend along all or a portion of the holding channel to provide a press fit mechanism to secure different sized splices (e.g., 2 mm, 3 mm, and 4 mm wide splices). In a preferred aspect, each splice holding channel includes a plurality of flexible arms, such as flexible arms 194a-194d disposed in splice holding channel 195a. The flexible arms are configured to provide a resistance force to press against a splice housing or protective cover. In addition, the flexible arms can be arranged to support two or more splices within each holding channel.

For example, mechanical splice 192a can be snuggly secured in holding channel 195a by arms 194a and 194b pressing mechanical splice 192a against opposite channel wall 197a. The flexible arms 194c and 194d can be formed to extend inward into holding channel 195a to provide an upper boundary to mechanical splice 192a. In addition, flexible arms 194c and 194d can be formed to independently and simultaneously secure a second splice, here fusion splice 191a, in holding channel 195a (as shown in FIG. 14, fusion splice 191a is stacked on top of mechanical splice 192a).

Referring back to FIG. 2, fibers are routed to the splicing area via a fiber routing structure 162 that allows for changing the direction of the fiber in a straightforward manner (and without bending the fiber beyond its minimum bend radius). The fiber routing structure 162 can also provide some slack storage of the incoming/exiting fiber(s). Further fiber guiding structures 164 and tabs 165 can be formed in splice tray 150 to route and support the fiber being spliced.

In an alternative aspect, portion 184 can be configured to hold or secure any number of different passive and/or active optical components. For example, portion 184 can be configured to hold or secure one or more of 1×N fiber optic splitters, 2×N fiber optic splitters, WDM components, CWDM components, switches, multiplexers, triplexers, duplexers, detectors, mirrors, lasers, amplifiers, or combinations thereof.

As shown in FIG. 4A, splice tray 150 can further include a removable cover 151, such as a plastic, preferably transparent cover. Preferably, cover 151 can be mounted onto tray 150 via simple snap fit.

In addition, FIGS. 1 and 4A show platform 110 configured to hold two (2) rows of splice trays. Thus, in further alternative embodiments, the fiber circuit management system can house a first row of splices, while a second row of trays 150 are configured to fiber optic connector panels, or active components.

As mentioned above, one or more splice trays 150 can be mounted onto fiber circuit platform 110. As shown in FIG. 3A, fiber circuit platform 110 includes a main fiber entrance/exit region 120 and a fiber circuit guiding region 130. In one aspect, fiber circuit platform 110 has a two level structure, with a first (e.g., top) level 112 configured for fiber routing and a second (e.g., lower) level 114 configured for slack storage. Level 114 has a relatively large area, making it more conducive for slack storage of jacketed fiber. In addition, slack storage can also be provided by additional structures, such as slack storage tray 195, shown in FIG. 4A (see also FIG. 8). Fiber can be routed from level 114 to level 112 via a ramp, such as ramp 117 shown in FIG. 3A.

The fiber entrance/exit region 120 is preferably located at one end of the fiber circuit platform 110, such as near the one or more ports 104 for receiving and distributing telecommunications cables. Fiber entrance/exit region 120 includes a plurality of fiber guides 121A, 121B that allow the user to initially separate and align groups of fibers from distribution cables and drop cables. Fiber entrance/exit region 120 further includes one or more fiber routing structures 122A and 122B, along with corresponding fiber guides 123A, 123B, that allow for straightforward routing and rerouting of the fibers (e.g., by changing fiber direction to route a particular fiber to a different region of the fiber circuit platform).

As shown in FIG. 4A, a removable protective cover 190 can be mounted onto the platform body to protect fiber entrance/exit region 120. Cover 190 can be mounted onto the platform body via a snap fit or other conventional mechanism. The cover 190 can protect the telecommunication lines covered thereby by preventing accidental pinching of the lines during installation of the housing cover on the enclosure base.

Fiber circuit platform 110 further includes a fiber circuit guiding region 130, which is configured to route fibers in multiple directions and to multiple splice tray locations. The fiber circuit guiding region is preferably formed as a substantially planar structure. In a preferred aspect, the first (upper) level of the fiber circuit platform 110 includes a fiber circuit guiding structure configured to route fibers in multiple directions and to multiple splice tray locations. In particular, fiber circuit guiding region 130, especially first (upper) level 112, includes multiple fiber channels to continually support fiber as it is routed about the fiber management system. In particular, in a preferred aspect, fiber circuit guiding region 130 includes one or more fiber corridors 132A, 132B, 132C, 132D which can allow for lengthwise passage of fiber along platform 110. Each corridor 132 can route fiber to either end of the platform 110 and provide fiber access to individual splice trays. To route individual or (relatively) small groups of fibers to a particular splice tray or trays, the fiber corridors 132A-132D are respectively disposed adjacent to multi-directional fiber channel regions 133A-133D. These channel regions 133A-133D are multidirectional in that physical fiber supporting channels are provided to direct fiber in more than one direction, at a suitable bending radius, to/from the splice trays.

Figure 3B:
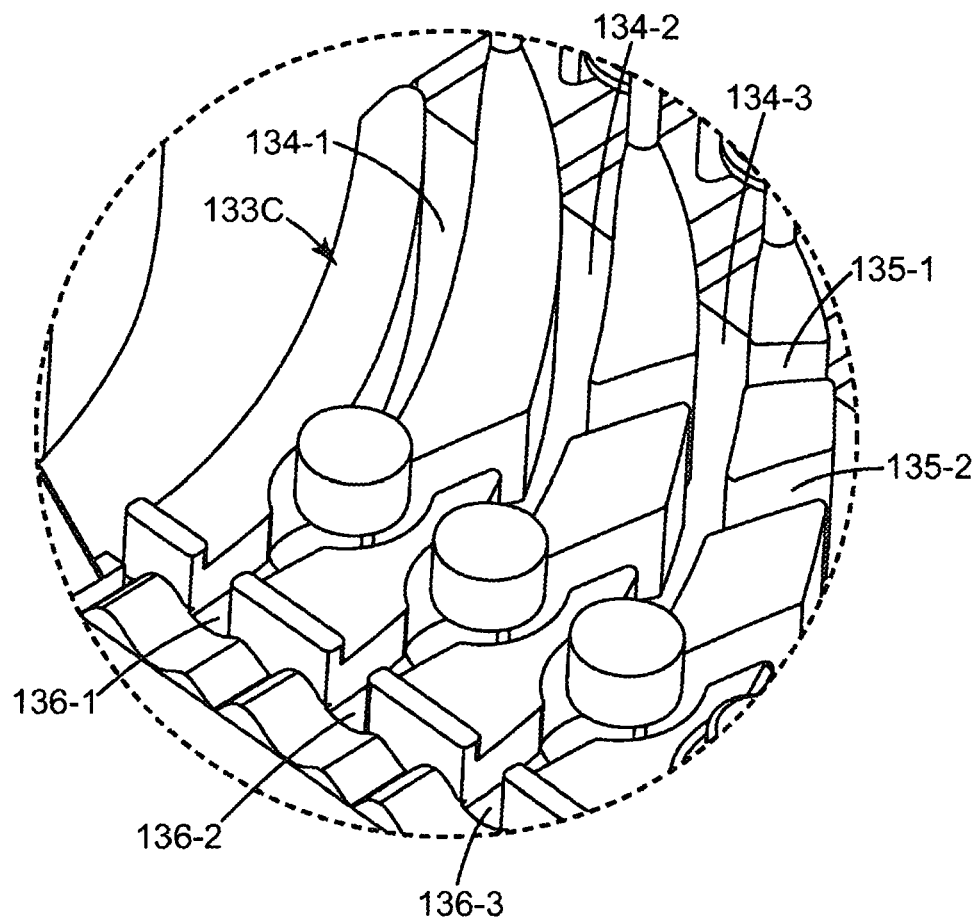
FIG. 3B is a close-up view of exemplary fiber guide structures according to an aspect of the present invention.
Figure 3C:
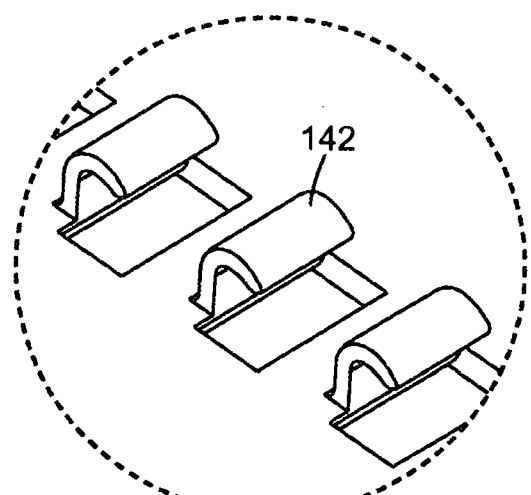
FIG. 3C is a close-up view of an exemplary hook structure according to an aspect of the present invention.
Figure 6:
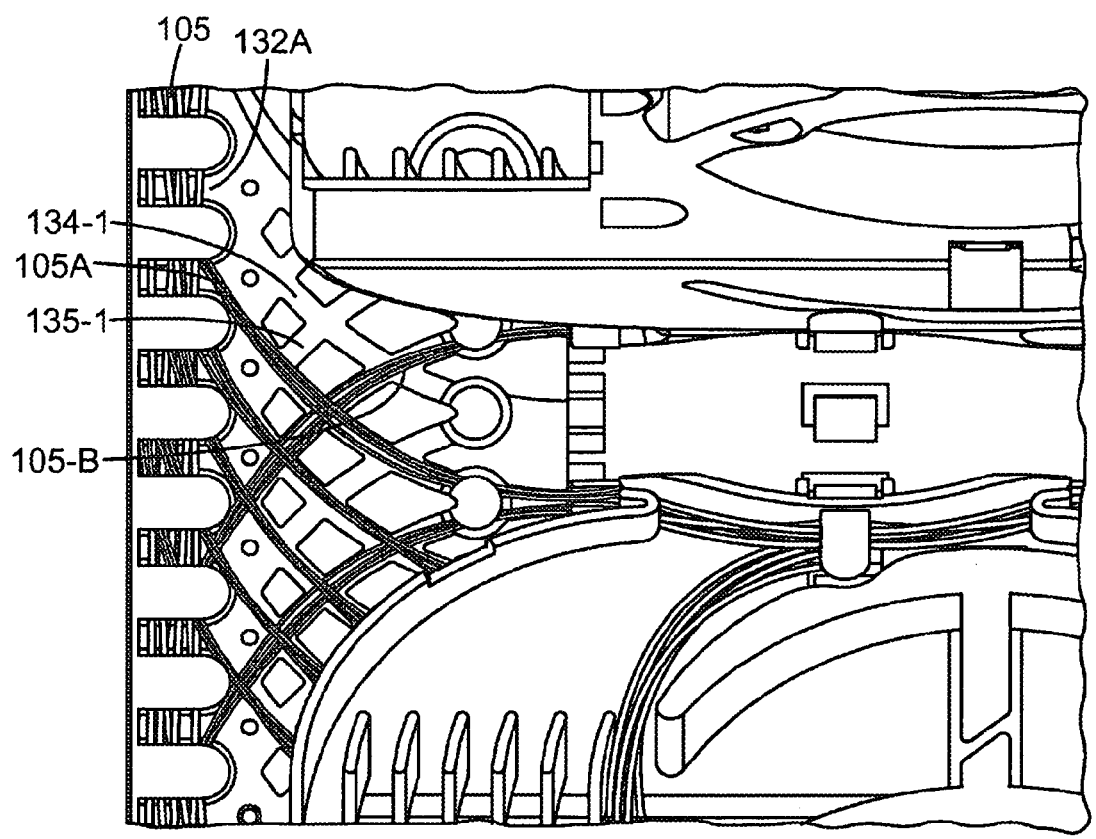
FIG. 6 is top view of fibers entering and exiting a fiber splice tray, with fibers being guided in multiple directions by continually supporting fiber guiding channels formed on the fiber circuit platform.

For example, as shown FIG. 3B and (and also, in operation, in FIG. 6), fibers 105 (preferably stripped of their outer protective jackets) can be routed in multiple directions, for example, as a fiber enters channel 136-1 it can then be routed in a first direction along channel 134-1 or be routed in a second direction along channel 135-1. A similar configuration of multiple paths is provided for channels 136-2, 136-3, etc. In this manner, continual support of the fiber is provided on fiber circuit platform 110. In addition, as shown in FIG. 6, fiber 105A can be routed from conduit 132A along channel 134-1 to channel 136-1 to an entrance/exit channel of the splice tray. Also, a fiber 105B can be routed from conduit 132A along channel 135-1 to channel 136-1 to the same entrance/exit channel of the splice tray. This configuration allows greater flexibility for guiding fibers in multiple directions while still providing physical support to the fibers. Fibers 105 can be standard optical telecommunications fibers, for example, fibers having a standard optical fiber buffer cladding, such as a 900 µm outer diameter buffer cladding, a 250 µm buffer cladding, or a fiber buffer cladding having an outer diameter being larger or smaller. Outer fiber jackets can be standard sizes, such as 1 mm, 2 mm, 3 mm, etc.

Figure 7:
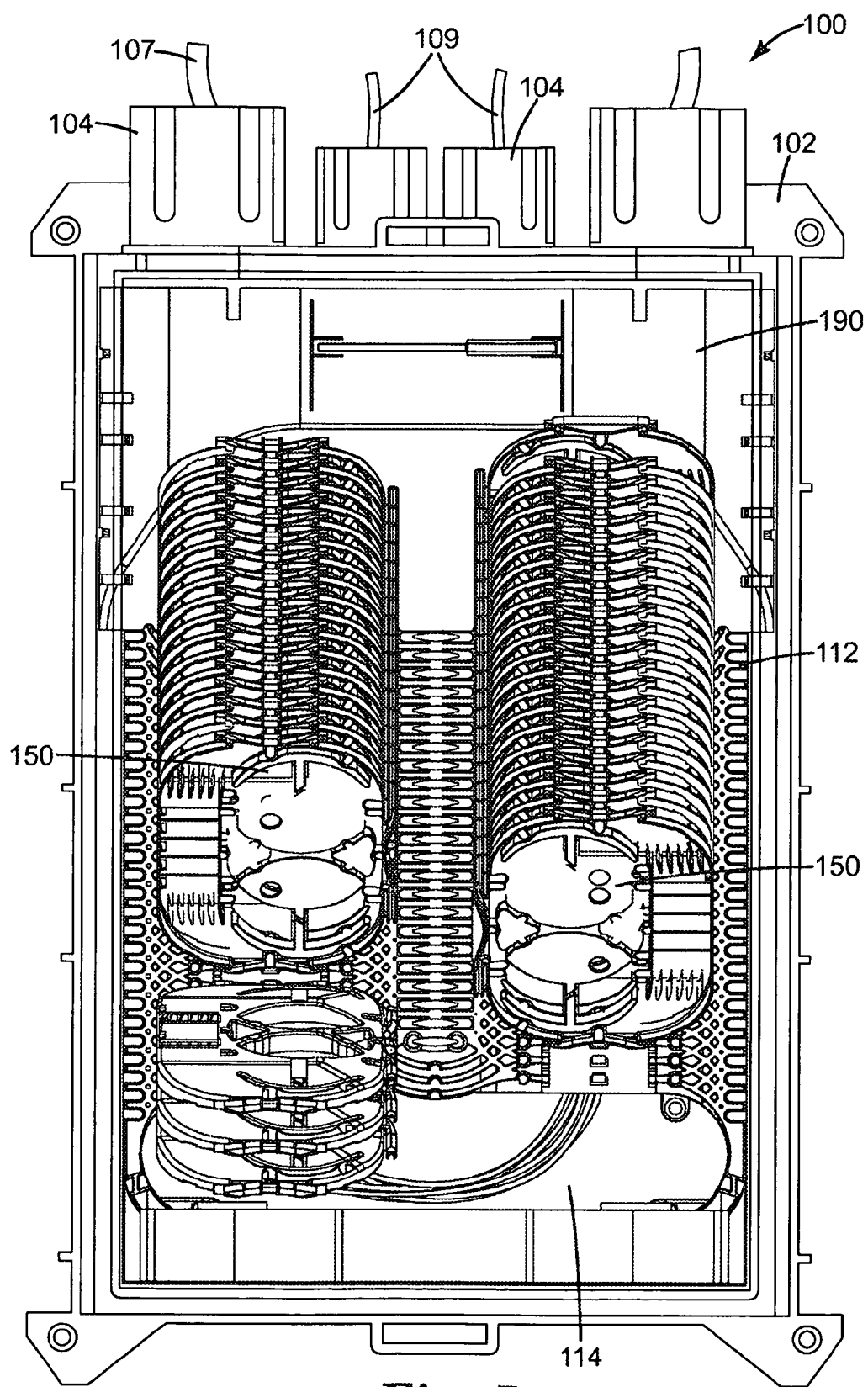
FIG. 7 is a top view of a fiber management system implemented in an open closure.
Figure 8:
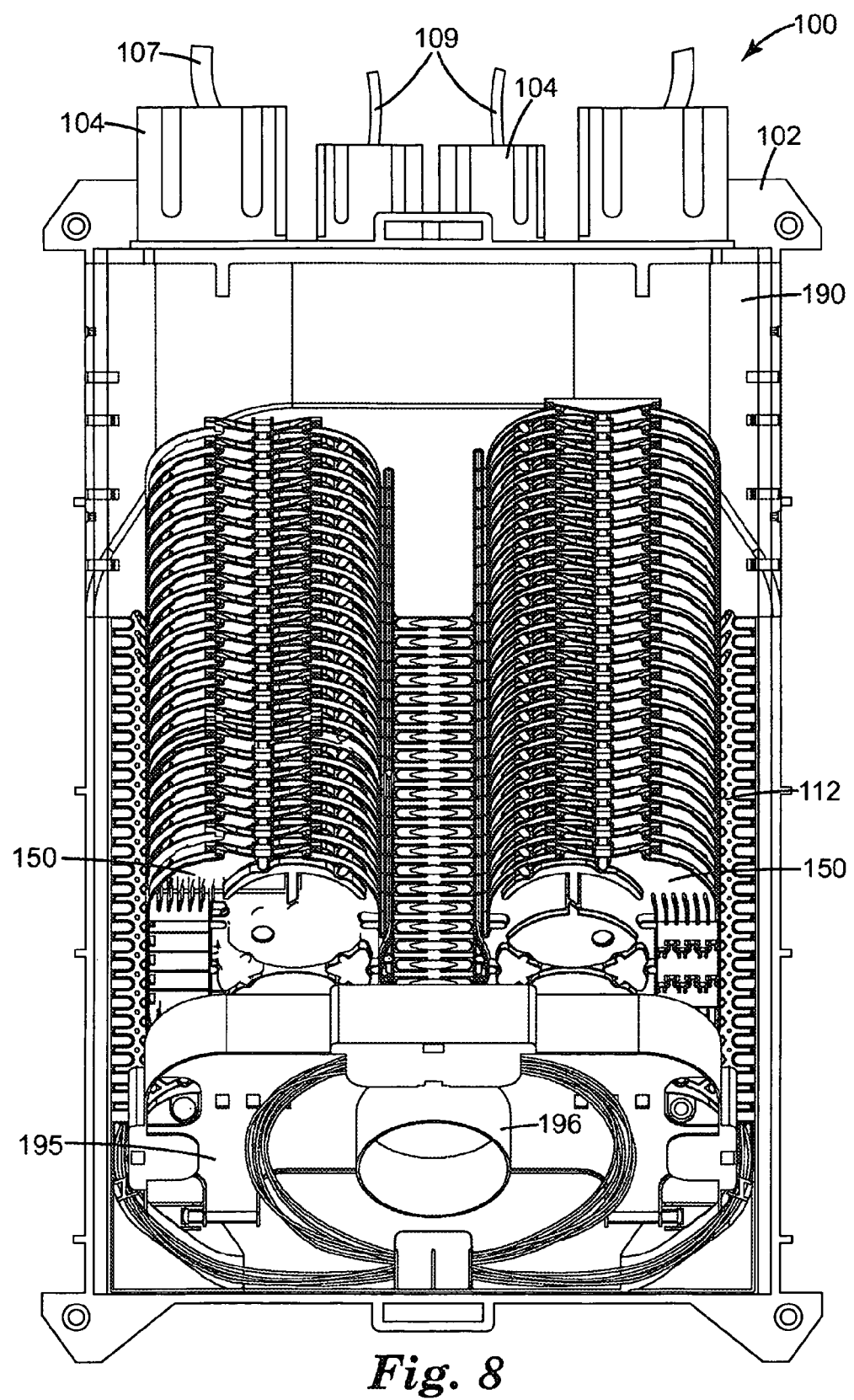
FIG. 8 is another top view of a fiber management system implemented in an open closure.

As mentioned above, splice tray 150 includes latching mechanisms 152A, 152B, and 152C. Each latching mechanism is formed on a different outer portion of the body of splice tray 150. Each of these latching mechanisms can be configured to engage with the fiber circuit platform 110, such as via hook structure 142, shown in close-up view in FIG. 3C. Preferably, the snap-fit or snug-fit engagement provides for a rotatable latching of the splice tray to the circuit platform. Such rotation allows a user to gain unobstructed access to a particular splice tray, without negatively affecting the other splice trays. For example, when the fiber platform is installed in an enclosure, the standard positioning for trays 150 can be the same as that shown in FIG. 4A. If a closure is then opened so that a further splicing or installation of a tray needs to be made, one or more of the trays can be rotated to a position such as is shown in FIG. 7.

An alternative latching structure is shown with respect to FIGS. 5A-5B, described in more detail below. As would be apparent to those of skill in the art given the present description, other types of latching structures could be utilized to provide the features described herein. In the embodiment of FIG. 3A, fiber circuit platform 110 includes 2 rows of hooks 142. In alternative embodiments, fiber circuit platform 112 can include a single row of hooks/latching structures or three rows of hooks/latching structures, or more rows, depending on the size constraints of the host closure.

FIG. 4A shows a fiber circuit platform 110 implemented with several splice trays 150, protective cover 190, and slack storage tray 195. The entirety of the components can be configured to reside in a conventional enclosure. As described above, a removable protective cover 190 can be mounted onto the platform body to protect fiber entrance/exit region 120. Cover 190 can be mounted onto the platform body via a snap fit or other conventional mechanism.

In addition, a slack storage tray 195 can also be provided. Tray 195 can rotatably couple to fiber circuit platform 110 via a latching mechanism 197, 198 (sec also FIG. 3A). In addition, one or more fiber routing structures 196 can be provided on tray 195 to help spool excess fiber (see e.g., FIG. 8, for an example implementation). As shown in FIG. 4B, when the latching mechanism of splice tray 150 is engaged with the platform 110, the fiber entrance/exit channel 157 can extend to a position proximate to a fiber guiding channel 136-1 formed on the fiber circuit platform 110. Thus, fiber being routed to or from the splice tray can be continually supported.

Figure 5A:
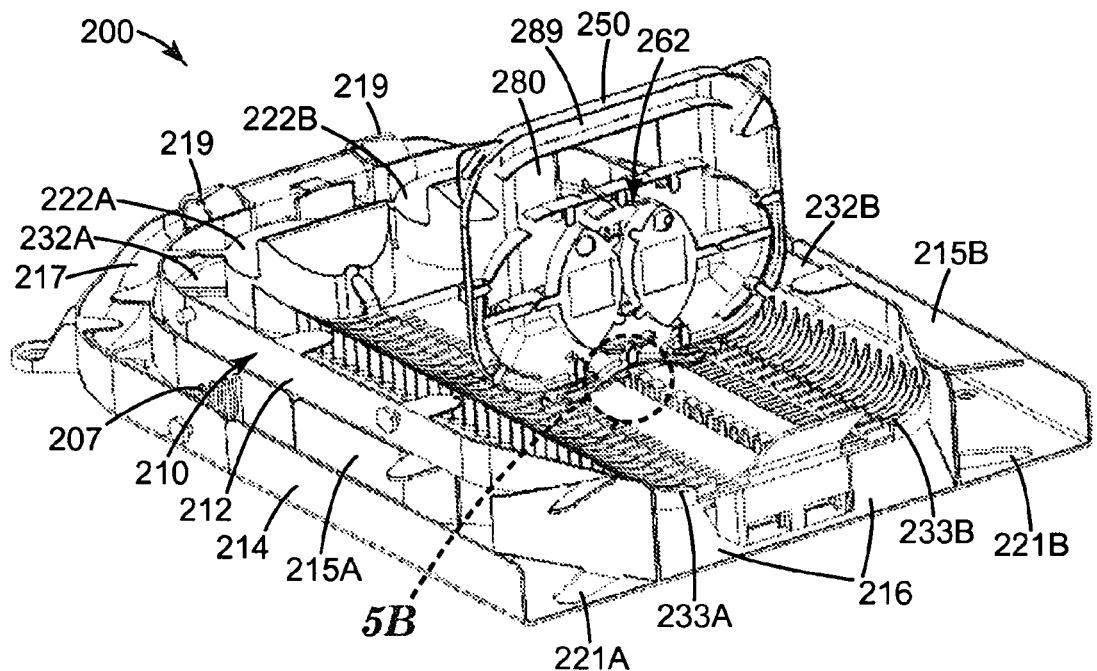
FIG. 5A is an isometric view of an alternative fiber management system according to another aspect of the present invention.
Figure 5B:
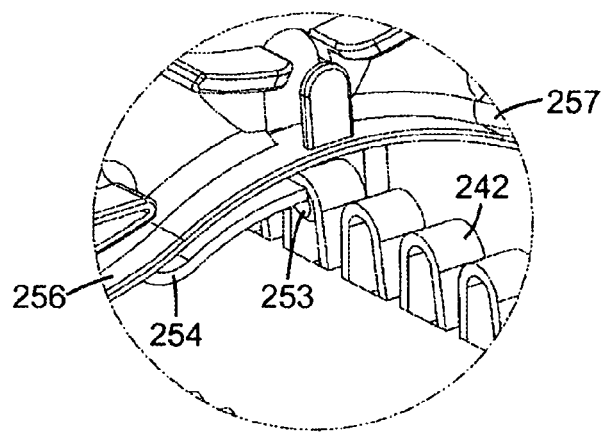
FIG. 5B is a close-up view of an alternative latching mechanism according to another aspect of the present invention.

FIG. 5A shows a fiber circuit management system 200 according to an alternative embodiment of the present invention. In particular, a fiber circuit platform 210 can include a plurality of splice trays 250. Fiber circuit platform 210 can be disposed in an enclosure similar to those described above. Fiber circuit platform 210, and elements thereof, can be formed of any suitable material, such as polymeric materials or, alternatively, metal.

Figure 9:
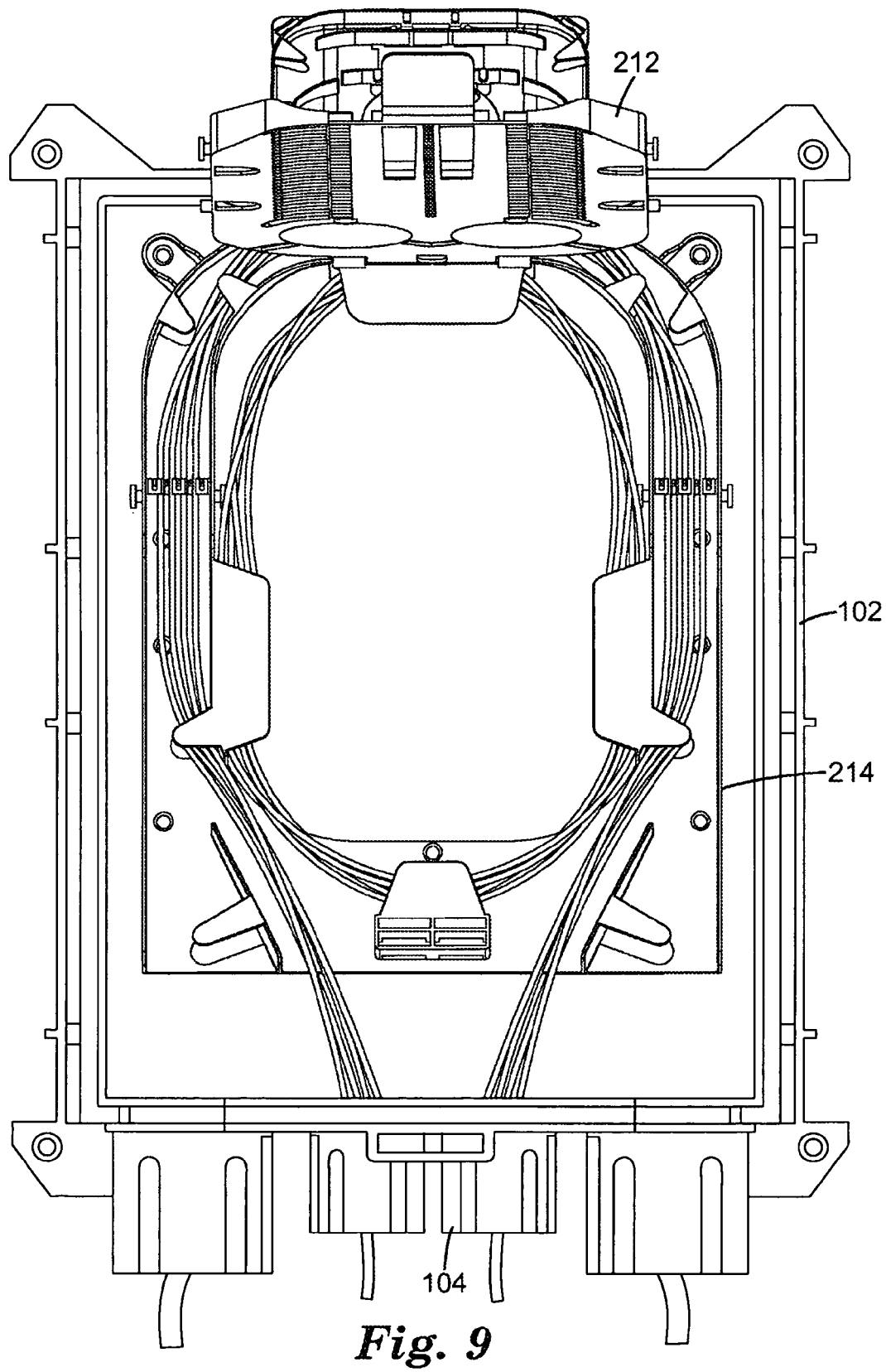
FIG. 9 is a top view of an alternative fiber management system implemented in an open closure, with the top tray in an open position exposing the slack storage area.

As shown in FIG. 5A, fiber circuit platform 210 includes a main fiber entrance/exit region and a fiber circuit guiding region. In a preferred aspect, fiber circuit platform 210 has a two-level structure, with a first (e.g., top) level 212 configured for fiber routing and a second (e.g., lower) level 214 configured for slack storage (see e.g., FIG. 9, which shows excess jacketed fiber being stored in level 214).

The fiber entrance/exit region is preferably located at one end of the fiber circuit platform 210, such as near the one or more ports for receiving and distributing telecommunications cables. The fiber entrance/exit region can include a plurality of fiber guides 221A, 221B that allow the user to initially separate and align groups of fibers from distribution cables and drop cables. The fiber entrance/exit region can further include entrance ports 216 for the slack storage area.

Figure 11:
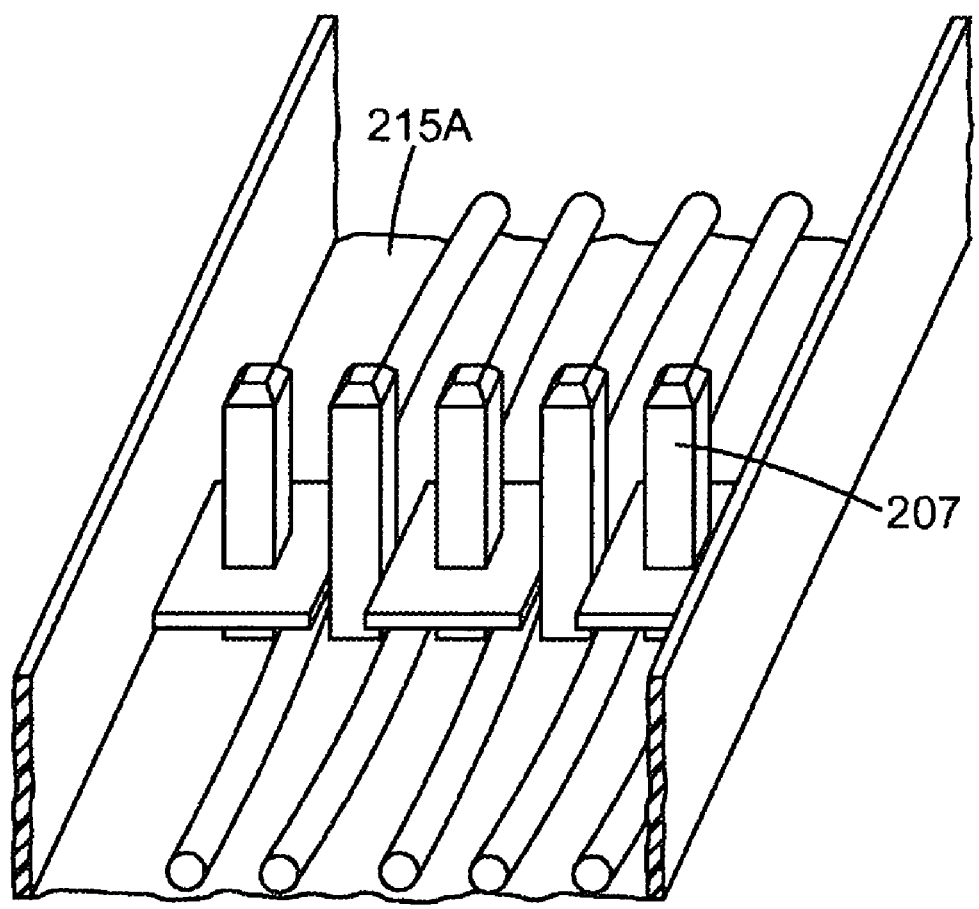
FIG. 11 is a close-up view of a post/washer structure to secure routed fibers.

In a preferred aspect, fibers are first routed to/from the distribution/drop cables along conduits 215A and 215B. In a further preferred aspect, conduits 215A and 215B are formed along a perimeter of lower level 214. Further fiber guiding and support can be provided by post/washer structures 207, which are coupled to and extend from conduits 215A/215B. In a preferred aspect, a series of posts separate the bundled fibers. The fibers can be held in place by washers, which are snugly fit around one or more of the posts (see FIG. 11 for a close up view). In a preferred aspect, post/washer structures 207 can secure jacketed portions of the fibers in place.

Figure 10:
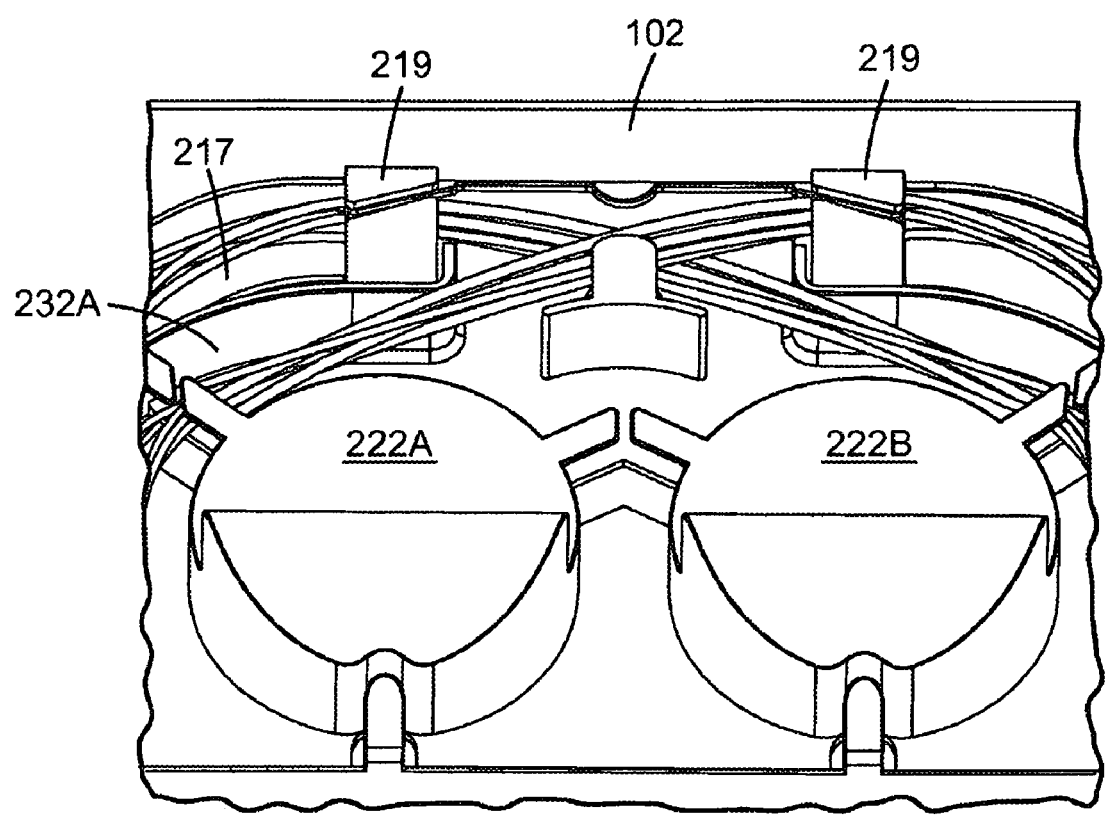
FIG. 10 is a close-up view of a coupling mechanism of an alternative fiber management system.

Stripped portions of the fibers can be guided to the upper splice tray level (level 212) via ramps 217 (see also FIG. 10 for a close-up view). In a preferred aspect, one or more fiber routing structures 222A and 222B are disposed on level 212 to provide for straightforward routing and rerouting of the fibers (e.g., by changing fiber direction to route a particular fiber to a particular region of the fiber circuit platform).

Fiber circuit platform 210 further includes a fiber circuit guiding region, which is configured to route fibers to multiple splice tray locations. In particular, in a preferred aspect, the fiber circuit guiding region includes one or more fiber corridors 232A, 232B, which can allow for lengthwise passage of fiber along platform 210. The fiber corridors 232A-232B are respectively disposed adjacent to fiber channel regions 233A-233B that continually support and route individual or (relatively) small groups of fibers to a particular splice tray or trays (at a bend radius that does not exceed the minimum bend radius of the fibers). These channel regions 233A-233B direct fiber to/from the splice trays 250.

Splice tray 250, similar to that described above, can be formed as a generally rectangular or oblong structure. As shown in FIG. 5A, splice tray 250 includes a single latching mechanism, disposed on an outer portion of the splice tray body, that allows for rotation of the splice tray while secured to the fiber circuit platform. Alternatively, multiple latching mechanisms may be formed on different perimeter portions of splice tray 250. Splice tray 250 includes an alternative latching mechanism, formed by post 253 and moveable member 254. As shown in FIG. 5B, post 253 can be secured in hoop or hook 242 (formed on the fiber circuit platform 210)

via a depressible arm 254, whose edge (in a non-depressed position) is proximate to an edge of post 253. To install or remove a splice tray, a user may simply depress arm 254 such that post 253 can be engaged into (or out of) position in hoop/hook 242.

In a preferred aspect, fiber entrance/exit channels 256, 257 are formed at the area of the latching mechanism as extensions that extend away from the main splice tray body area. In addition, similar to that described above with respect to FIG. 2, fiber entrance/exit channels 256, 257 can extend from the latching area in a slightly curved configuration to prevent potential kinks or unintended bends being placed on the entering/exiting fibers that are received by the splice tray. In addition, fiber entrance/exit channels 256, 257 provide continual support to the entering/exiting fibers as the splice tray 250 is being rotated (tilted) forward and backward while secured on fiber circuit platform 210.

Fiber from the distribution cable/drop cable is received in fiber entrance/exit channels 256, 257 and then routed to a splicing area 280. Similar to that described above with respect to FIG. 2, the splicing area 280 is configured to support mechanical and/or fusion splices made to the fiber. The splicing portion of area 280 can be formed as an integral portion of tray 250, or, alternatively, tray 250 can be formed with a cutout at splicing area 280 so that different splicing inserts can be mounted to the tray 250, depending on the application (e.g., an insert configured to support one or more fusion splices, or an insert to support one or more mechanical splices). In a further alternative, splicing area 280 can be configured to hold or secure one or more of 1×N fiber optic splitters, 2×N fiber optic splitters, WDM components, CWDM components, switches, multiplexers, triplexers, duplexers, detectors, mirrors, lasers, amplifiers, or combinations thereof. Moreover, in yet a further alternative, additional channel 289 can be configured to hold such an optical component (e.g., a N×M fiber optic splitter), while splicing area 280 is configured to support mechanical and/or fusion splices made to the fiber. Fibers are routed to the splicing area via a fiber routing structure 262 that allows for changing the direction of the fiber in a straightforward manner (and without bending the fiber beyond its minimum bend radius). Further fiber guiding structures and tabs can be formed in splice tray 250 to route and support the fiber being spliced.

In a preferred aspect, level 212 is rotatable relative to level 214. In particular, level 212 can be coupled to level 214 via coupling structures 219. In this manner, the upper level 212 can be rotated out of its regular operation position (see e.g., FIG. 9), so that a user can have unobstructed access to the slack storage region, with little or no significant displacement of the routed fiber disposed on level 212. Excess lengths of telecommunication lines are thus easily accessible, but simultaneously prevented from interfering with splicing of telecommunication lines on the splice trays. In addition, coupling structures 219 (see e.g., FIG. 5A) can include slit portions formed therein to allow a user to insert and remove routed fiber in a straightforward manner.

Figure 12:
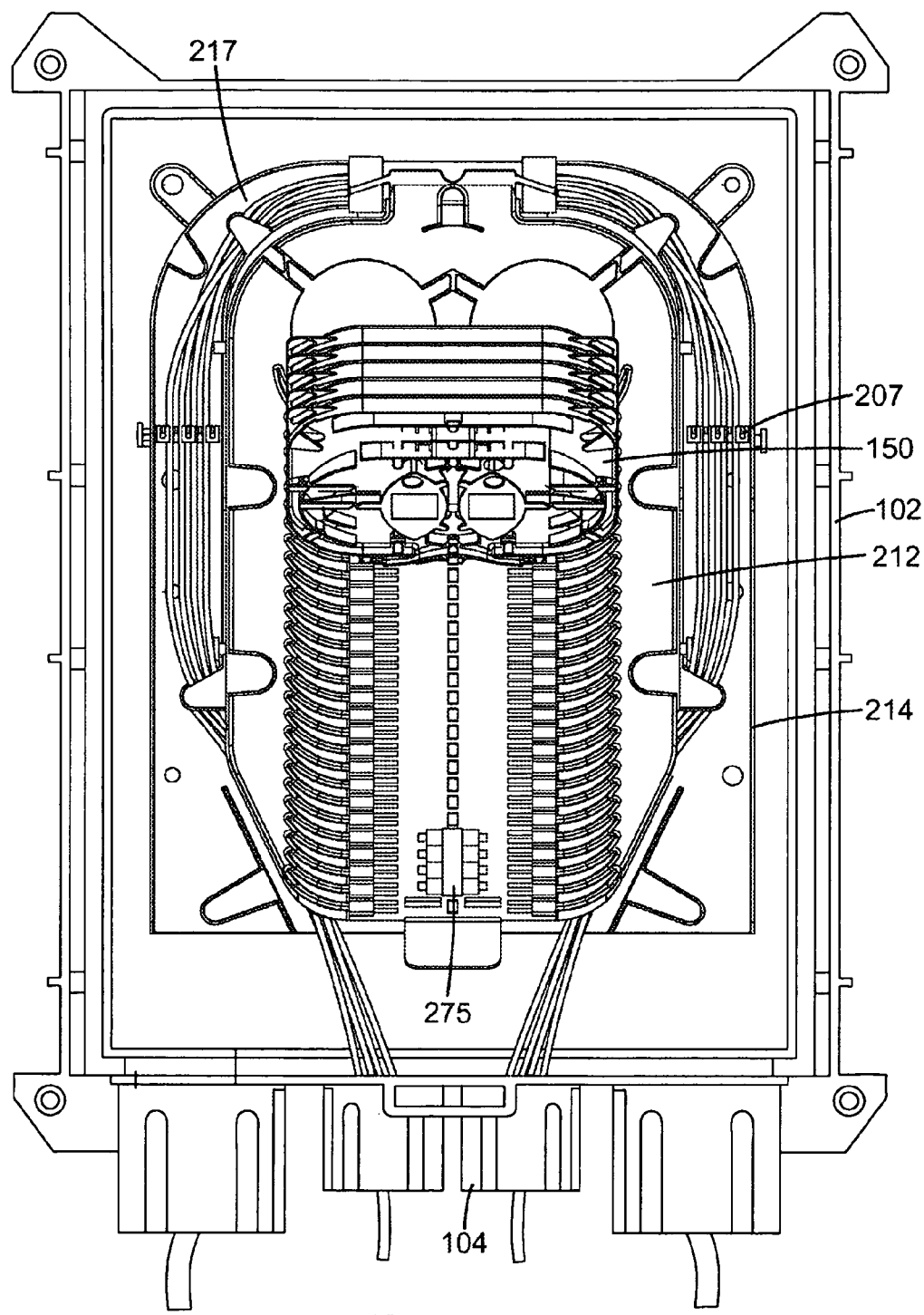
FIG. 12 is a top view of an alternative fiber management system implemented in an open closure, with a fiber optic connector adaptor/coupling holder disposed therein.

In an alternative aspect, as is shown in FIG. 12, upper level 212 can be configured to additionally house one or more fiber optic connector adaptor/coupling holders 275. The fiber optic connector adaptor/coupling holders 275 can provide coupling to the platform such that the platform 210 can be utilized for cross connect or interconnect distribution hub applications. This configuration would provide, for example, the platform to be used as a hub to individually drop a service to a customer using a spliced or pre-terminated drop connection.

In a further alternative, fiber circuit management system 200 can be configured to include a clamping mechanism to receive and clamp the cable strength member of a jacketed fiber cable (distribution cable or drop cable). This configuration can be particularly useful in cabinet or wall mounted closure applications of, e.g., a multi-dwelling unit.

Thus, the embodiments of the present invention are directed to fiber management systems, in particular, fiber circuit platforms that allow a user to provide straightforward fiber circuit management at a premise or location. As described above, each splice tray can be its own fiber circuit, either as a single circuit, two circuits, or more circuits. This approach provides for greater flexibility when adding additional subscribers at a location or premise.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

The invention claimed is:

1. A fiber circuit management system, comprising:
a fiber circuit platform; and
a splice tray to hold a fiber splice, the splice tray being rotatably coupled to the fiber circuit platform, the splice tray including at least one latching mechanism rotatably engageable with the fiber circuit platform and disposed on an outer portion of the splice tray, wherein the at least one latching mechanism includes a coupling portion and one or more fiber entrance/exit channels that are formed as an extension that extends away from a main splice tray body area, wherein each of the one or more fiber entrance/exit channels extends to a position proximate to a respective fiber guiding channel formed on the fiber circuit platform, wherein the splice tray includes a fiber routing structure that provides for a changing of the direction of the fiber in more than one direction, wherein the coupling portion comprises a post and moveable member securable in a hoop structure formed on the fiber circuit platform, wherein the moveable member is depressible such that the post can be engaged into position in the hoop structure.

2. The fiber circuit management system of claim 1, wherein the splice tray includes a plurality of latching mechanisms, where each latching mechanism is disposed on a different portion of the outer portion of the splice tray.

3. The fiber circuit management system of claim 1, wherein the one or more fiber entrance/exit channels extend in a slightly curved configuration.

4. The fiber circuit management system of claim 1, wherein the splice tray includes a splicing area, wherein the splicing area is configured to support at least one of 1×N fiber optic splitters, 2×N fiber optic splitters, WDM components, CWDM components, and combinations thereof.

5. The fiber circuit management system of claim 1, wherein the splice tray includes a splicing area configured to support at least one of a mechanical splice and a fusion splice.

6. The fiber circuit management system of claim 5, wherein the splicing area is formed as an integral portion of the splice tray.

7. The fiber circuit management system of claim 5, wherein the splicing area is formed as a cutout configured to receive at least one insert having a portion configured to support the at least one of a mechanical splice and a fusion splice.

8. The fiber circuit management system of claim 5, wherein the splicing area comprises:
   a plurality of posts formed on a base portion of the splicing area, each of the posts including a lobe-shaped portion configured to engage the at least one of a mechanical splice and a fusion splice; and
   a plurality of guiding structures disposed between the posts on the base portion to align and reduce lateral displacement of the at least one of a mechanical splice and a fusion splice.

9. The fiber circuit management system of claim 5, wherein the splicing area comprises:
   a first splice holding channel and second splice holding channel, each splice holding channel configured to hold one or more of the at least one of a mechanical splice and a fusion splice, and each splicing channel including one or more flexible arms extending at least a portion of the holding channel.

10. The fiber circuit management system of claim 1, wherein the fiber circuit platform includes a main fiber entrance/exit region and a fiber circuit guiding region, wherein the fiber circuit platform has a two level structure, with a first level configured for fiber routing and a second level configured for fiber slack storage.

11. The fiber circuit management system of claim 1, wherein the fiber circuit platform further includes a slack storage tray mountable to a portion thereof.

12. The fiber circuit management system of claim 10, wherein the fiber entrance/exit region includes a plurality of fiber guides that provide for the separation and alignment of fibers received therein, wherein the fiber entrance/exit region further includes one or more fiber routing structures that provide for routing and rerouting of fibers received therein.

13. The fiber circuit management system of claim 10, wherein the first level of the fiber circuit platform includes a fiber circuit guiding structure configured to route fibers in multiple directions and to multiple splice tray locations, wherein the fiber circuit guiding structure includes multiple fiber channels to continually support fiber as it is routed about the fiber management system.

14. The fiber circuit management system of claim 13, wherein the fiber circuit guiding structure includes one or more fiber corridors which provide for lengthwise passage of a fiber along the fiber circuit platform, wherein each corridor can route fiber to either end of the fiber circuit platform and provide fiber access to individual splice trays mounted on the fiber circuit platform.

15. The fiber circuit management system of claim 14, wherein each fiber corridor is disposed adjacent to a multi-directional fiber channel region, wherein the multi-directional fiber channel region provides a plurality of fiber supporting channels configured to direct fiber in more than one direction to and from an entrance/exit channel of the splice tray and at a bending radius that does not exceed a minimum bend radius of fiber supported therein.

16. A telecommunications enclosure comprising the fiber circuit management platform of any of the preceding claims.

17. A fiber circuit management system, comprising:
   a fiber circuit platform that includes a main fiber entrance/exit region and a fiber circuit guiding region; and
   a splice tray rotatably mountable to the fiber circuit guiding region, wherein the fiber circuit platform has a multiple level structure, with a first level configured for fiber routing and a second level configured for slack storage, wherein received fibers are guided to the fiber routing level via at least one ramp, wherein the splice tray includes a latching mechanism to rotatably couple the splice tray to fiber circuit guiding region, wherein each latching mechanism includes a coupling portion and one or more fiber entrance/exit channels, wherein the coupling portion comprises a post and moveable member securable in a hoop structure formed on the fiber circuit platform, wherein the moveable member is depressible such that the post can be engaged into position in the hoop structure.

18. A fiber circuit management system, comprising:
   a fiber circuit platform that includes a main fiber entrance/exit region and a fiber circuit guiding region; and
   a splice tray rotatably mountable to the fiber circuit guiding region, wherein the fiber circuit platform has a multiple level structure, with a first level configured for fiber routing and a second level configured for slack storage, wherein received fibers are guided to the fiber routing level via at least one ramp, further comprising a post and washer structure coupled to and extending from conduits formed on the second level, wherein a series of posts separate bundled fibers and washers which are snugly fit around one or more of the posts hold the fibers in place by washers.

* * * * *

UNITED STATES PATENT AND TRADEMARK OFFICE
CERTIFICATE OF CORRECTION

Page 1 of 1

PATENT NO.         : 8,189,983 B2
APPLICATION NO.    : 12/439761
DATED              : May 29, 2012
INVENTOR(S)        : Herve Brunet et al.

It is certified that error appears in the above-identified patent and that said Letters Patent is hereby corrected as shown below:

Column 14,
Line 12, delete "any of the preceding claims" and insert in place thereof -- claim 1 --.

Signed and Sealed this
Thirteenth Day of November, 2012

David J. Kappos
*Director of the United States Patent and Trademark Office*